United States Patent
Stec et al.

(10) Patent No.: US 10,356,346 B1
(45) Date of Patent: Jul. 16, 2019

(54) METHOD FOR COMPENSATING FOR OFF-AXIS TILTING OF A LENS

(71) Applicant: FotoNation Limited, Galway (IE)

(72) Inventors: Piotr Stec, Galway (IE); Brian O'Sullivan, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/904,858

(22) Filed: Feb. 26, 2018

(51) Int. Cl.
*H04N 5/357* (2011.01)
*G06T 7/80* (2017.01)

(52) U.S. Cl.
CPC ............. *H04N 5/3572* (2013.01); *G06T 7/80* (2017.01)

(58) Field of Classification Search
CPC ................................ H04N 5/3572; G06T 7/80
See application file for complete search history.

(56) References Cited

U.S. PATENT DOCUMENTS

| | | | | |
|---|---|---|---|---|
| 8,482,628 | B1 * | 7/2013 | Khan ..................... | H04N 5/217 348/222.1 |
| 9,280,810 | B2 | 3/2016 | Stec et al. | |
| 2004/0032952 | A1 * | 2/2004 | Pinto ..................... | H04N 5/217 380/54 |
| 2004/0125227 | A1 * | 7/2004 | Tsuruoka ............... | H04N 5/217 348/340 |

(Continued)

OTHER PUBLICATIONS

Beauchemin et al., "Modelling and Removing Radial and Tangential Distortions in Spherical Lenses", Multi-Image Analysis, 10th International Workshop on Theoretical Foundations of Computer Vision Dagstuhl Castle, Germany, Mar. 12-17, 2000, pp. 1-21.

(Continued)

*Primary Examiner* — Cynthia Segura (57) ABSTRACT

A method for compensating for off-axis tilting of a lens relative to an image sensor in an image acquisition device comprises acquiring a set of calibrated parameters $$\vec{n} \equiv \begin{pmatrix} n_x \\ n_y \\ n_z \end{pmatrix}$$

corresponding to the tilting of said lens. $P_x'$ and $P_y'$ indicate a coordinate of a pixel in an acquired image. Image information is mapped from the acquired image to a lens tilt compensated image according to the formulae:

$$P_x' = \frac{s}{n_z(n_z - 1)}((n_x^2 + n_z(n_z - 1))u_x + n_x n_y u_y)$$

$$P_y' = \frac{s}{n_z(n_z - 1)}((n_y^2 + n_z(n_z - 1))u_y + n_x n_y u_x)$$

where s comprises a scale factor given by $$s = \frac{n_z}{u_x n_x + u_y n_y + n_z}$$

and where $u_x$ and $u_y$ indicate the location of a pixel in the lens tilt compensated image.

6 Claims, 5 Drawing Sheets

(56) References Cited

U.S. PATENT DOCUMENTS

| | | | | |
|---|---|---|---|---|
| 2005/0261849 A1* | 11/2005 | Kochi | ............... | H04N 5/217 |
| | | | | 702/85 |
| 2011/0032374 A1* | 2/2011 | Imanishi | ............... | B60R 1/00 |
| | | | | 348/222.1 |
| 2013/0100249 A1* | 4/2013 | Norita | ............... | G01B 11/245 |
| | | | | 348/46 |
| 2013/0242129 A1* | 9/2013 | Harmeling | ............... | G06T 5/001 |
| | | | | 348/222.1 |
| 2014/0009568 A1* | 1/2014 | Stec | ............... | G06T 5/006 |
| | | | | 348/36 |
| 2014/0063229 A1* | 3/2014 | Olsson | ............... | H04N 5/2252 |
| | | | | 348/84 |
| 2014/0111672 A1* | 4/2014 | Seki | ............... | H04N 9/646 |
| | | | | 348/242 |

OTHER PUBLICATIONS

Strickler, Prof. Didier, "Camera model and calibration" https://ags.cs.uni-kl.de/fileadmin/inf_ags/3dcv-ws11-12/3DCV_WS11-12_lec03.pdf.

Stec, et al. "Method and system for correcting a distorted input image," U.S. Appl. No. 15/879,310, filed Jan. 24, 2018.

"Mars Autonomy Project Stereo Ranging", Field Robotics Center, Carnegie Mellon Robotics Institute, https://www.frc.ri.cmu.edu/projects/mars/stereo.html.

\* cited by examiner

METHOD FOR COMPENSATING FOR OFF-AXIS TILTING OF A LENS

FIELD

The present invention relates to a method for compensating for off-axis tilting of a lens.

BACKGROUND

Figure 1:
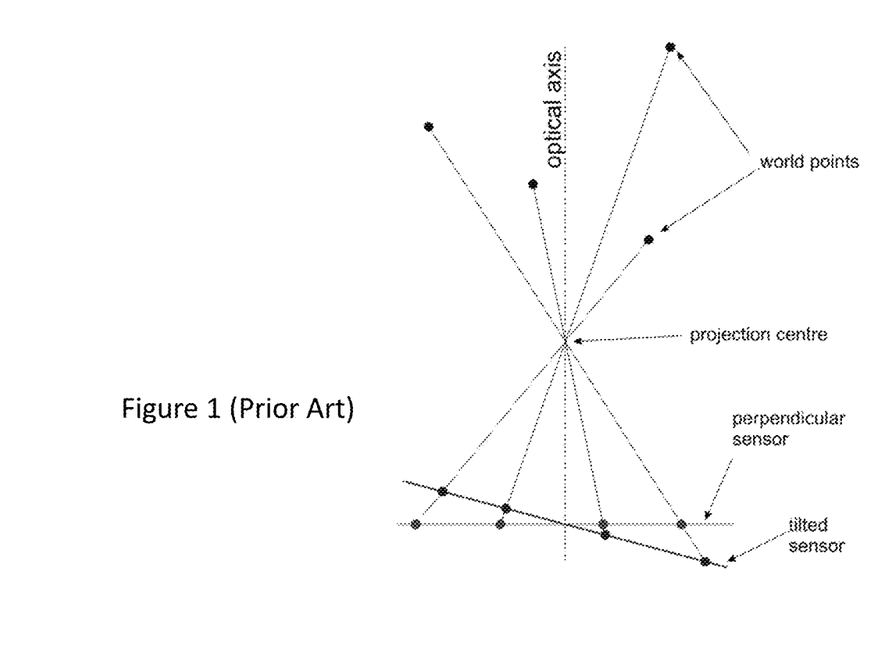
FIG. 1 shows lens projection on perpendicular and on tilted projection planes.

Referring now to FIG. 1, when a lens is assembled to a camera, it is hard to ensure that an optical axis of the lens is perfectly perpendicular to an imaging sensor surface. Unless compensation is applied, this misalignment will cause geometrical distortion to any image produced by the lens.

In order to compensate for lens tilt, it must be properly modelled and the modelling parameters estimated.

Both Matlab Camera Calibration Toolbox and OpenCV refer to the distortion caused by lens tilt as "tangential distortion" and suggest that it can be corrected by the following set of equations:

$$x_{dist} = x + (2p_1 xy + p_2(r^2 + 2x^2))$$

$$y_{dist} = Y + (p_1(r^2 + 2y^2) + 2p_2 xy)$$

where $x_{dist}$, $y_{dist}$ are the x,y coordinates of a pixel within an image distorted by a tilted lens; x, y are the normalised pixel coordinates;

r is the distance to the optical axis where $r = \sqrt{x^2 + y^2}$; and $p_1, p_2$ are the modelling parameters.

However, according to Beauchemin et al., "Modelling and Removing Radial and Tangential Distortions in Spherical Lenses", Multi-Image Analysis, 10th International Workshop on Theoretical Foundations of Computer Vision Dagstuhl Castle, Germany, Mar. 12-17, 2000, pp. 1-21 the above equations are based on thin prism distortion caused by the misalignment of the lens optical elements and are applicable only to spherical lenses. Thus, these equations may not be applicable in the case of lenses containing a large number of aspherical elements such as lens assemblies common in modern smartphones.

SUMMARY

There is provided an image acquisition system arranged to compensate for off-axis tilting of a lens according to each of claim 1 or 4.

In an image acquisition system with a lens tilt of 0.25 degrees, the errors between the present method and the conventional method are 1.5 pixels on average with 3 pixels maximum for a 2 Mpixel Full-HD image sensor. This error gets worse for higher resolutions and so the improvement provided by the invention improves for higher resolution image sensors.

Similarly, the error grows quite significantly with the amount of tilt, thus lower quality lens modules can also benefit more from the invention than higher quality devices.

BRIEF DESCRIPTION OF THE DRAWINGS

Embodiments of the invention will now be described, by way of example, with reference to the accompanying drawings, in which.

DESCRIPTION OF THE EMBODIMENTS

Figure 2:
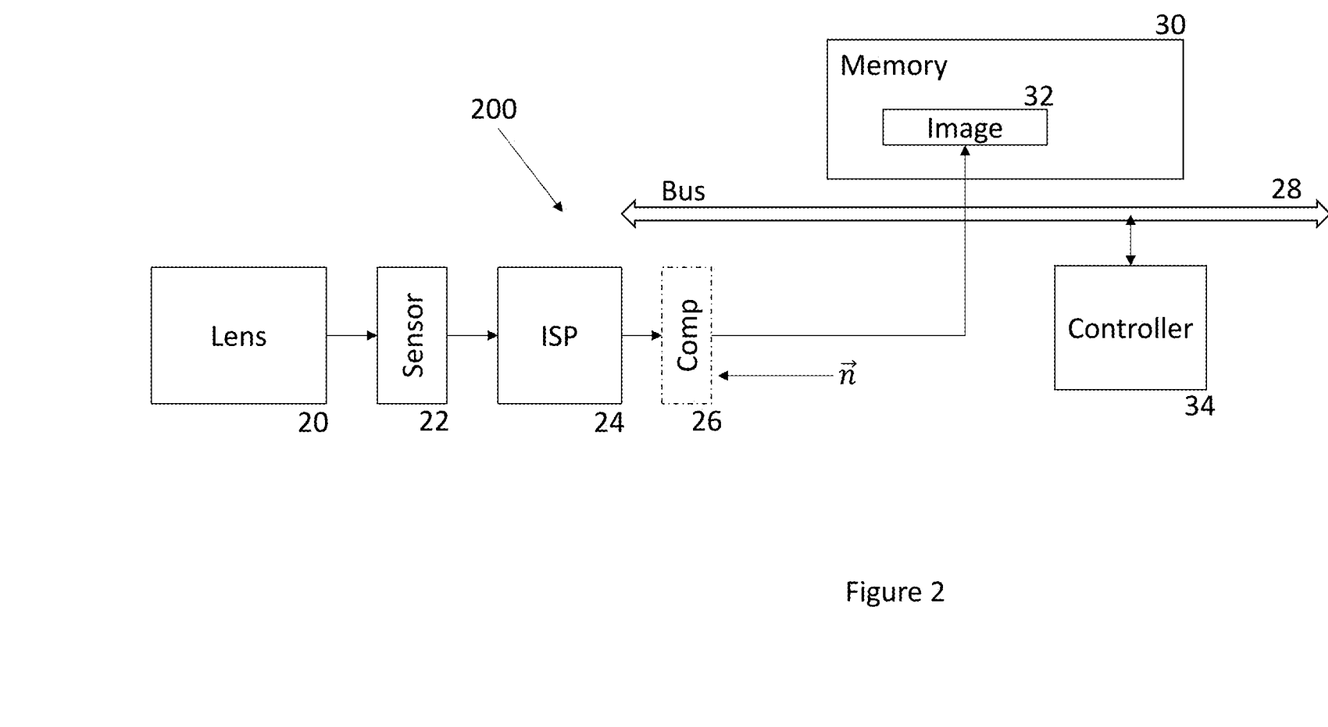
FIG. 2 illustrates an image acquisition system arranged to compensate for off-axis tilting of a lens according to the present invention.

Referring now to FIG. 2 an image acquisition system 200 according to an embodiment of the present invention is shown. The acquisition system 200 comprises an otherwise conventional lens system 20 and sensor 22 assembly where the optical axis of the lens may not be orthogonal to the sensor surface. The lens 20 may either be integrally formed within the acquisition system 200, as in the case of smartphones, tablets or laptop computers and indeed some dedicated cameras; or the lens 20 may be of the interchangeable type fitted to a camera body. Typically, raw image information acquired by the sensor 22 is initially processed by an image sensor pipeline (ISP) 24 before an image 32 is written across a system bus 28 for storage in system memory 30.

Compensation for lens tilt can be implemented at any stage in the image processing pipeline and in the example of FIG. 2, a compensation module 26 is shown downstream in the image processing pipeline from the ISP 24. The module functionality may of course be integrated with the ISP 24 or indeed any other module processing acquired image information before it is written to system memory, for example, a module performing other forms of distortion correction as described in U.S. Pat. No. 9,280,810 and U.S. patent application Ser. No. 15/879,310, the disclosure of which are herein incorporated by reference. Alternatively, the module might be applied as part of a post-processing of an image 32 stored in memory 30 and could be implemented either as dedicated firmware, as described in the above referenced U.S. Pat. No. 9,280,810 and U.S. patent application Ser. No. 15/879,310, or in software running on a general purpose processor such as a system controller 34 for the system 200.

In any case, the system controller 34 provides the compensation module 26 with a set of parameters $\vec{n}$ which can then be used by the module 26 to map pixel information from an image distorted by lens tilt to a distortion corrected image and these parameters along with how they can be used are described in more detail below.

In the description below, the effect caused by lens tilt does not need to take into account lens projection, as the model is only concerned with the path of light exiting the lens 20.

It can be observed, that for any field angle, the lens is producing a cone of light that intersects the sensor surface. We need to find the shape of the intersection as a function of the tilt. It is convenient to describe such a transformation in terms of mapping the "perfect" point coordinates produced by the lens 20 when it is perfectly aligned with the sensor 22, to the new coordinates which are distorted by the sensor tilt. In this way, the lens projection characteristics can be separated from the effect caused by the lens tilt. The problem can be approached from two directions, each producing equivalent end results:

1. Modelling the Lens Tilt by Raytracing

For convenience, we can assume that a projection plane is on the same side of the plane as object. It is a common convention used in computer graphics as the ISP 24 typically flips the raw image produced by lens 20, so there is no point in reversing this process in order to model the fact that the lens produces a flipped image.

We adopt the convention that the z-axis of the coordinate system is the optical axis and the ideal projection (not tilted) is done on the plane z=1 with the projection centre in the origin of the coordinate system.

Figure 3:
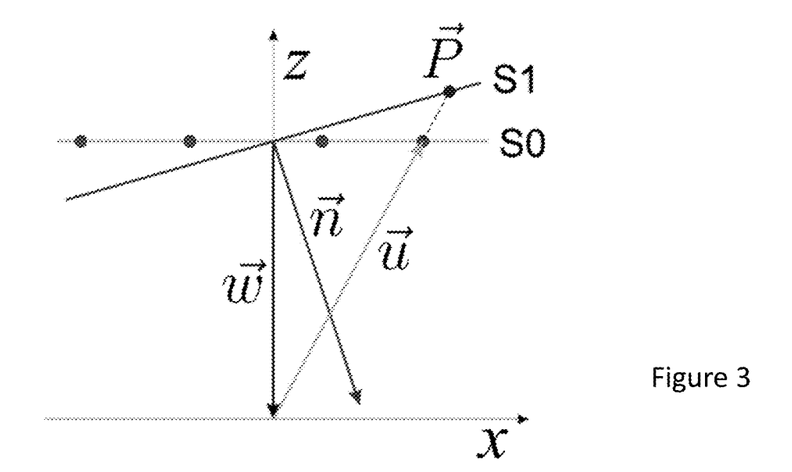
FIG. 3 shows vectors describing projection on a tilted plane employed in describing an embodiment of the present invention.

Referring now to FIG. 3 which comprises a sideways view on the xz plane, let S0 be the horizontal sensor plane and S1 the tilted sensor plane. The normal vector of S0 will be:

$$\vec{w} \equiv \begin{pmatrix} 0 \\ 0 \\ -1 \end{pmatrix}$$

and the unit normal vector of S1 will be $$\vec{n} \equiv \begin{pmatrix} n_x \\ n_y \\ n_z \end{pmatrix}$$

An ideally projected point will form a vector $$\vec{u} \equiv \begin{pmatrix} u_x \\ u_y \\ 1 \end{pmatrix}$$

where $u_x$ and $u_y$ are normalised coordinates on the horizontal plane S0.

The first stage of this approach is to find a point $\vec{P}$ which is the intersection of the ray described by the vector $\vec{u}$ with the plane S1. In order to do that we need to find a scale factor s that will stretch the vector $\vec{u}$ to make it meet with S1. The scale factor s is defined as:

$$s = -\frac{\vec{n} \cdot \vec{w}}{\vec{n} \cdot \vec{u}}$$

Since the vector $\vec{w}$ is aligned with the coordinate system it can be simplified to:

$$s = \frac{n_z}{u_x n_x + u_y n_y + n_z}$$

The 3D position of the point $\vec{P}$ is defined as $$\vec{P} = \begin{pmatrix} P_x \\ P_y \\ P_z \end{pmatrix} = s\vec{u} = s \begin{pmatrix} u_x \\ u_y \\ 1 \end{pmatrix}$$

These calculations are relatively simple to implement and are very friendly for GPU or DSP implementations where dot products can be efficiently calculated by using SIMD (Single Instruction/Multiple Data) instructions.

Since we are interested in the position of point $\vec{P}$ in the local coordinates of S1, the coordinates of point $\vec{P}$ must be rotated in order to align them with the xy plane of the coordinate system. This can be done by finding a rotation matrix $\hat{R}$ that rotates the vector $\vec{n}$ to the vector $\vec{w}$.

The rotation axis is defined by the cross product between the vectors $\vec{n}$ and $\vec{w}$:

$$\vec{v} = \vec{n} \times \vec{w} = \begin{pmatrix} -n_y \\ n_x \\ 0 \end{pmatrix}$$

$$\vec{v} = \begin{pmatrix} v_x \\ v_y \\ v_z \end{pmatrix} = \begin{pmatrix} -n_y \\ n_x \\ 0 \end{pmatrix}$$

and the cosine of the rotation angle is defined as the dot product between these vectors:

$$\cos\theta = \vec{w} \cdot \vec{n} = -n_z$$

The vector $\vec{v}$ can be used to construct a skew-symmetric matrix $\hat{V}$:

$$\hat{V} = \begin{bmatrix} 0 & -v_z & v_y \\ v_z & 0 & -v_x \\ -v_y & v_x & 0 \end{bmatrix}$$

The rotation matrix $\hat{R}$ can be calculated by rearranging the Rodriguez formula to the following form, and plugging in for the values of $\cos\theta$ and $\hat{V}$:

$$\hat{R} = \hat{1} + \hat{V} + \frac{\hat{V}^2}{1+\cos\theta} = \begin{bmatrix} 1 + \frac{n_x^2}{n_z - 1} & \frac{n_x n_y}{n_z - 1} & n_x \\ \frac{n_x n_y}{n_z - 1} & 1 + \frac{n_y^2}{n_z - 1} & n_y \\ -n_x & -n_y & -n_z \end{bmatrix}$$

To perform the rotation around the projection plane origin, the points have to be first shifted to the coordinate centre, rotated then shifted back to the original location. So the final point coordinates in the local coordinate system of the tilted plane are defined as follows:

$$\vec{P}' = \hat{R}(\vec{P} + \vec{w}) - \vec{w}$$

Since we are not interested in the z coordinate of the point $\vec{P}'$ (as it should equal 1 for all points), the calculations can be simplified to:

$$P'_x = \frac{s}{n_z(n_z - 1)}((n_x^2 + n_z(n_z - 1))u_x + n_x n_y u_y)$$

$$P'_y = \frac{s}{n_z(n_z - 1)}((n_y^2 + n_z(n_z - 1))u_y + n_x n_y u_x)$$

with the scale factors given by $$s = \frac{n_z}{u_x n_x + u_y n_y + n_z}$$

The form of the above equations makes them readily computed using SIMD instructions. For example, the compensation module 26 can simply step through each $u_x$, $u_y$ pixel location of a lens tilt compensated output image and determine the corresponding coordinates $P_x'$, $P_y'$ in the input distorted image—note that these coordinates need not necessarily correspond with a pixel location in the input image. As described in U.S. Pat. No. 9,280,810 and U.S. patent application Ser. No. 15/879,310, some interpolation between input image pixel values for pixel locations surrounding the input image coordinates may then be required to produce the pixel value for the output image pixel location.

Moreover, slight reorganisation of the equations will allow for further parallelization. The calculation of s and the expression in parentheses can be performed in parallel followed by the multiplication of the results.

2. Modelling the Lens Tilt by Conical Section

Figure 4A:
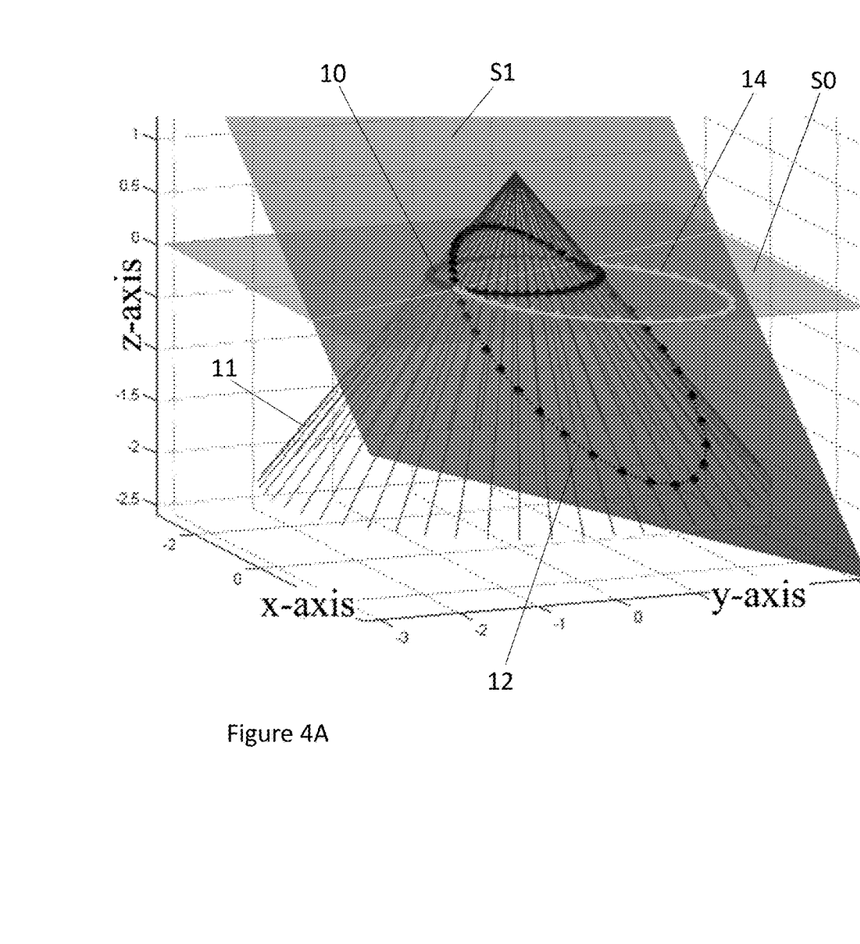
FIG. 4A and FIG. 4B show conic sections employed in a second approach to describing an embodiment of the present invention.
Figure 4B:
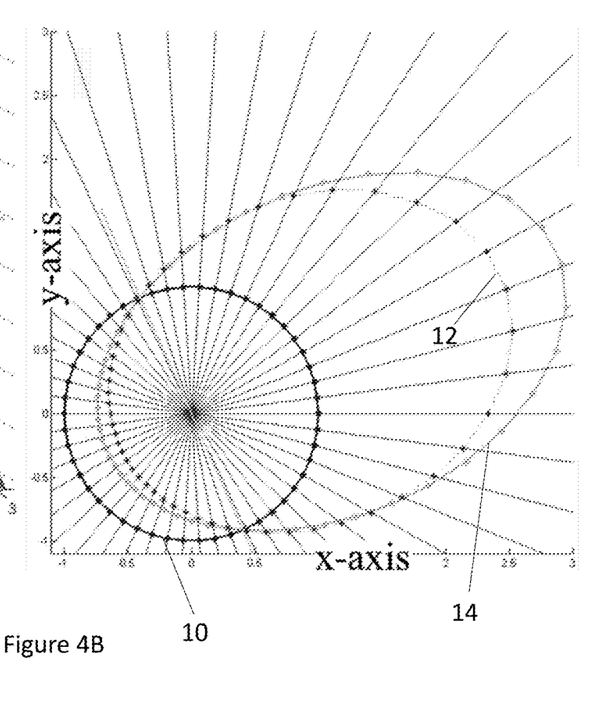

Referring to FIG. 4A and FIG. 4B which show conic sections employed in a second approach to describing an embodiment of the present invention.

The circle 10 shows the intersection between the horizontal plane S0 and the cone of light 11 produced by the lens that intersects the sensor surface; the ellipse 12 is the intersection of the tilted plane S1 and the cone; and the ellipse 14 is the ellipse after rotation back to the horizontal plane S0. A non-linear mapping $\vec{p} \mapsto \vec{q}$, FIG. 6, detailed below transforms the points of the circle 10, to the ellipse 14.

In this case, the coordinate system is inverted with respect to the previous ray tracing approach, as the optical centre is located at (0,0,1), so the focal point vector $\vec{f} = -\vec{w}$, and the horizontal plane is located at z=0.

Figure 5:
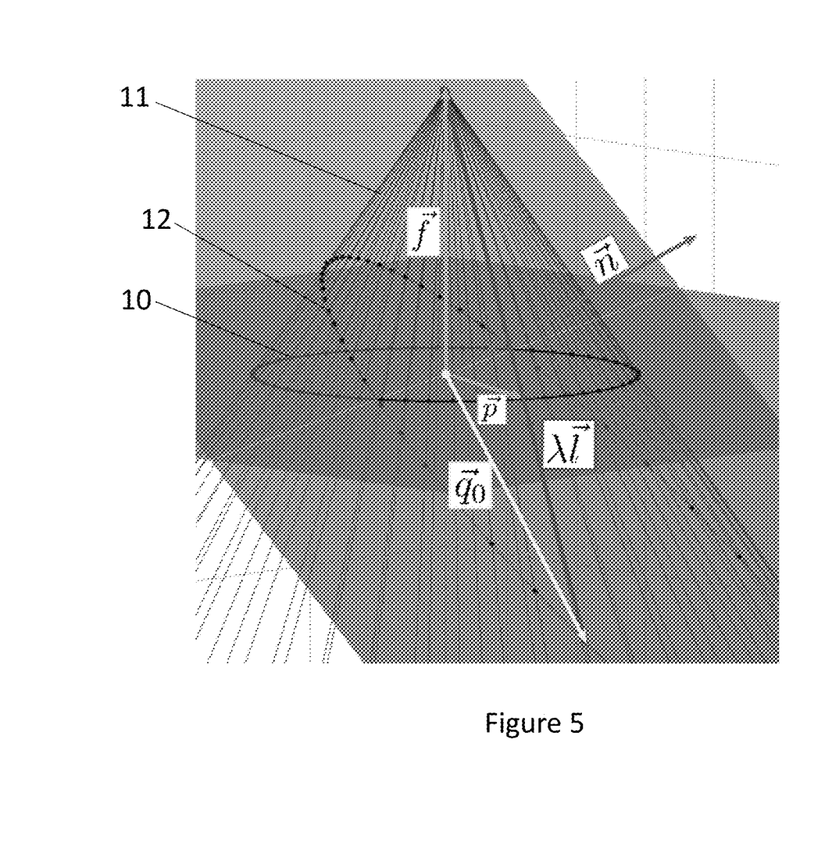
FIG. 5 illustrates the conic section and vectors of FIG. 4A and FIG. 4B.

Referring to FIG. 5, if $\vec{n}$ is a normal vector to the plane Z, the general equation of the plane is given by the set of all points $\vec{z} \in Z$ which satisfy:

$$\vec{n} \cdot \vec{z} = x n_x + y n_y + z n_z + n_1 = 0$$

and the vectors are:

$$\vec{z} = \begin{pmatrix} x \\ y \\ z \\ 1 \end{pmatrix}$$

$$\vec{n} = \begin{pmatrix} n_x \\ n_y \\ n_z \\ n_1 \end{pmatrix}$$

where $\vec{z}$ is an element of the 3-dimensional projective plane $\vec{z} \in \mathbb{P}^3$. The 4$^{th}$ element of the normal vector is a translational component and describes the displacement of the tilted plane from the origin: (x,y,z)=(0,0,0). Here we need only consider planes which contain the origin. Therefore we may exclude the translational component and treat the unit normal $\vec{n}$ as a 3-vector. There are 2 planes that are of interest to this study; respectively defined by the normal vectors Horizontal plane:

$$\vec{n}_0 \equiv \begin{pmatrix} 0 \\ 0 \\ 1 \end{pmatrix}$$

Tilted plane:

$$\vec{n}_1 \equiv \begin{pmatrix} n_x \\ n_y \\ n_z \end{pmatrix}$$

With $\vec{n}_0 = \vec{f}$, which is the focal point $\vec{f}$ of the lens, and the centre of projection.

$$\vec{f} = \begin{pmatrix} 0 \\ 0 \\ 1 \end{pmatrix}$$

The cone of light rays 11 emanating from the focal point is illustrated in FIG. 4A. For a given field angle, the lens is producing a cone of light that intersects the imaging sensor. In the ideal case the imaging sensor is perfectly perpendicular to the optical axis and the intersection points describe a circle 10.

The 2-dimensional coordinates of the intersection points with the horizontal plane are described by the vector:

$$\vec{p} = \begin{pmatrix} p_x \\ p_y \\ 0 \end{pmatrix}$$

The light rays extend from the centre of projection toward the horizontal plane.

$$\vec{l} = \vec{p} - \vec{f} = \begin{pmatrix} p_x \\ p_y \\ -1 \end{pmatrix}$$

The light rays $\vec{l}$ extend from the focal point $\vec{f}$ and intersect the horizontal plane at $\vec{p}$. The intersection points are transformed to the tilted plane $\vec{q}_0$ under the non-linear mapping $$\vec{p} \mapsto \vec{q}_0$$

Where $\vec{q}_0$ are the 3-dimensional transformed coordinates defined by $$\vec{q}_0 = \vec{f} + \lambda \vec{l}$$

Where is the non-linear scaling of the light rays between the horizontal and tilted plane. The explicit form of the scaling parameter is found from the dot product of $\vec{q}_0$ with the normal to the tilted imaging sensor plane $\vec{n}$.

$$\vec{n} \cdot (\vec{f} + \lambda \vec{l}) = 0$$

$$\lambda = -\frac{\vec{n} \cdot \vec{f}}{\vec{n} \cdot \vec{l}}$$

$$\lambda = \frac{n_z}{n_z - n_x p_x - n_y p_y}$$

The light rays intersect the tilted plane at $\vec{q}_0$.

$$\vec{q}_0 = \begin{pmatrix} \lambda p_x \\ \lambda p_y \\ 1 - \lambda \end{pmatrix}$$

The intersection of the light rays with the tilted plane is illustrated by the ellipse 12 in FIG. 4A, FIG. 4B, and FIG. 5. When the imaging sensor 22 is tilted with respect to the optical axis, it is rotated by an angle θ around an axis $\vec{k}$ which passes through the origin. The rotation axis is the cross product of the focal point vector $\vec{f}$ and the unit normal $\vec{n}$.

$$\vec{k} = \vec{f} \times \vec{n}$$

$$\vec{k} = \begin{pmatrix} k_x \\ k_y \\ k_z \end{pmatrix} = \begin{pmatrix} n_y \\ -n_x \\ 0 \end{pmatrix}$$

The cosine of the angle of rotation is given by the dot product between the unit normal to the tilted plane and the focal point vector:

$$\cos \theta = \vec{f} \cdot \vec{n} = n_z$$

Figure 6:
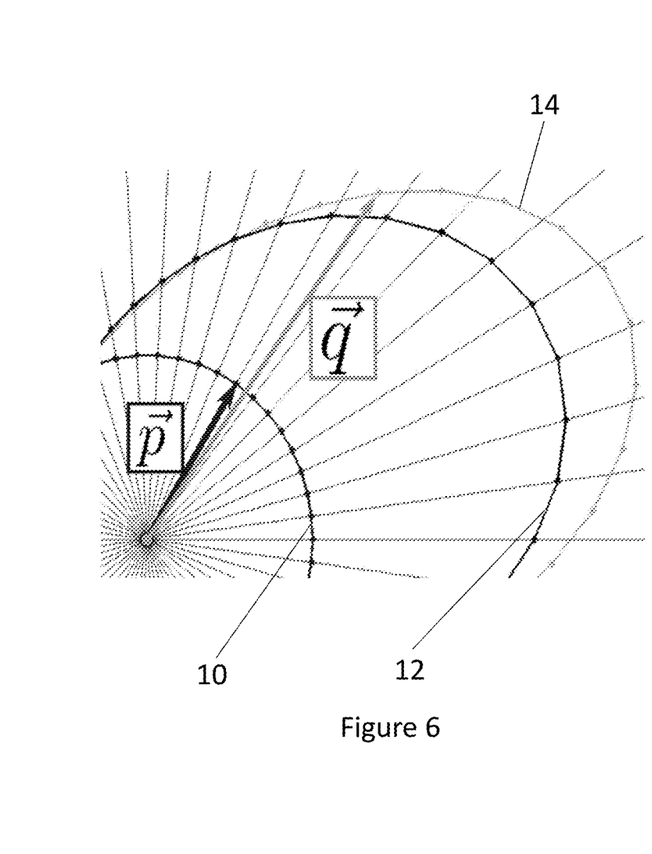
FIG. 6 shows a non-linear mapping $\vec{p} \mapsto \vec{q}$ projecting the coordinates of a circle onto an ellipse according to the present invention.

We seek the non-linear mapping:

$$\vec{p} \mapsto \vec{q}$$

Where $\vec{p}$ and $\vec{q}$ are 2-dimensional vectors, both with a zero component along the optical axis $p_z = q_z = 0$.

The 2-dimensional transformed coordinates are found by rotating $\vec{q}_0$ back to the horizontal plane, via:

$$\vec{q} = \hat{Q} \vec{q}_0$$

$\hat{Q}$ is an axis-angle quaternion, described by the Rodrigues rotation equation.

$$\hat{Q} = \hat{1} + \hat{K} + \hat{K}^2 \left( \frac{1}{1 + \cos \theta} \right)$$

where $\hat{1}$ is the identity matrix, and $\hat{K}$ is a skew symmetric matrix given by the axis of rotation:

$$\hat{K} = \begin{bmatrix} 0 & -k_z & k_y \\ k_z & 0 & -k_x \\ -k_y & k_x & 0 \end{bmatrix}$$

Making the substitutions $$\cos \theta = n_z \text{ and } (k_x, k_y, k_z) = (n_y, -n_x, 0)$$

the Rodrigues axis-angle quaternion simplifies to:

$$\hat{Q} = \begin{bmatrix} 1 - \frac{n_x^2}{1 + n_z} & -\frac{n_x n_y}{1 + n_z} & -n_x \\ -\frac{n_x n_y}{1 + n_z} & 1 - \frac{n_y^2}{1 + n_z} & -n_y \\ n_x & n_y & n_z \end{bmatrix}$$

Applying the rotation $$\vec{q} = \hat{Q} \vec{q}_0$$

we obtain the 2-dimensional transformed coordinates $$\vec{q} = \frac{\lambda}{n_z(1 + n_z)} \begin{pmatrix} (n_x^2 + n_z(1 + n_z))p_x + n_x n_y p_y \\ (n_y^2 + n_z(1 + n_z))p_y + n_x n_y p_x \\ 0 \end{pmatrix}$$

The non-linear mapping from $p_x \mapsto q_x$, and from $p_y \mapsto q_y$, is $$p_x \mapsto \frac{\lambda}{n_z(1 + n_z)}((n_x^2 + n_z(1 + n_z))p_x + n_x n_y p_y)$$

$$p_y \mapsto \frac{\lambda}{n_z(1 + n_z)}((n_y^2 + n_z(1 + n_z))p_y + n_x n_y p_x)$$

with the scale factor λ given by:

$$\lambda = \frac{n_z}{n_z - n_x p_x - n_y p_y}$$

Now that the parameters $\vec{n}$ defining the above described model and their application to compensate an acquired image for lens tilt have been described, it will be appreciated that any image acquisition system 200 (camera) having a lens tilt calibration module 26 driven by these parameters $\vec{n}$ can be readily calibrated as described at the following link: http://ags.cs.uni-kl.de/fileadmin/inf ags/3dcv-ws11-12/ 3DCV WS11-12 lec03.pdf, Stricker by pointing the camera at a 3-surface reference object to acquire a single 2-D image and then applying a global optimisation algorithm to determine parameters both for camera location (X,Y,Z) and rotation (Rx,Ry,Rz) relative to the reference object as well as camera model parameters including taking into account lens distortion as well as lens tilt parameters $\vec{n}$ by minimizing an error function mapping the points of the reference object to locations in the acquired 2-D image.

While the approach of Stricker is based on a reference object including a checkerboard type pattern, other reference objects can comprise surfaces including boards comprising unique ChArUco characters rather than a repeating pattern of the same unit.

Note that there may also be a loss in focus associated with lens tilt but this is not considered in detail here. Nonetheless, the above compensation technique can be combined with any other technique compensating for any loss of focus.

In variants of the above embodiments, rather than supplying the three coordinates for the vector $\vec{n}$ directly, these can instead be derived from a pair of scalars, NX and NY generated by a calibration process as described above. First, a length of the input vector is calculated as follows: d=sqrt(NX$^2$+NY$^2$+1) (essentially a third scalar NZ=1). Then the components of the vector $\vec{n}$ are calculated as follows:

$n_x$=NX/d $n_y$=NY/d $n_z$=1/d.

Using such an approach, the interface for the compensation module 26 can be made interchangeable with that of compensation modules using the prior art approach, yet still provide an improved result.

Note that the above derivation from two parameters is just an example and other methods might be used, for example, the vector $\vec{n}$ could be derived from two rotation angles of a sensor plane.

The invention claimed is:

1. An image acquisition system comprising a lens assembled to project an image onto an image sensor, where the lens is tilted relative to the image sensor, the image acquisition system including a calibration module configured to:

acquire a set of calibrated parameters $$\vec{n} \equiv \begin{pmatrix} n_x \\ n_y \\ n_z \end{pmatrix}$$

corresponding to said tilting of said lens, where z is the optical axis relative to which said lens is tilted;
acquire an image from said image sensor through said lens, where P$_x$' and P$_y$' indicate a coordinate of a pixel in said acquired image;
map image information from said acquired image to a lens tilt compensated image according to the formulae:

$$P'_x = \frac{s}{n_z(n_z-1)}((n_x^2 + n_z(n_z-1))u_x + n_x n_y u_y)$$

$$P'_x = \frac{s}{n_z(n_z-1)}((n_x^2 + n_z(n_z-1))u_x + n_x n_y u_y)$$

where s comprises a scale factor given by $$s = \frac{n_z}{u_x n_x + u_y n_y + n_z}$$

and where $u_x$ and $u_y$ indicate the location of a pixel in said lens tilt compensated image;
and store said lens tilt compensated image in a memory.

2. An image acquisition system according to claim 1 wherein said calibration module is configured to map image information by: selecting a pixel location $u_x$, $u_y$ in said lens tilt compensated image, determining a corresponding coordinate P$_x$', P$_y$' in said acquired image, determining a plurality of pixel locations in said acquired image surrounding said coordinate, and interpolating pixel values for said surrounding pixel locations to determine a value for the pixel location in said lens tilt compensated image.

3. An image acquisition system according to claim 1 wherein said calibration module is configured to acquire said set of calibrated parameters $$\vec{n} \equiv \begin{pmatrix} n_x \\ n_y \\ n_z \end{pmatrix}$$

by:
acquiring a pair of calibrated scalar parameters NX, NY;
determining a length d=sqrt(NX$^2$+NY$^2$+1); and
calculating the components of $\vec{n}$ as follows:

$n_x$=NX/d $n_y$=NY/d $n_z$=1/d.

4. An image acquisition system comprising a lens assembled to proiect an image onto an image sensor, while the lens is tilted relative to the image sensor, the image acquisition system including a calibration module configured to:

acquire a set of calibrated parameters $$\vec{n} \equiv \begin{pmatrix} n_x \\ n_y \\ n_z \end{pmatrix}$$

corresponding to said tilting of said lens, where z is the optical axis relative to which said lens is tilted;
acquire an image from said image sensor through said lens, where $p_x$ and $p_y$ indicate a location of a pixel in a lens tilt compensated image;
map image information from said lens tilt compensated image to said acquired image according to the formulae:

$$p_x \mapsto \frac{\lambda}{n_z(1+n_z)}((n_x^2 + n_z(1+n_z))p_x + n_x n_y p_y)$$

$$p_y \mapsto \frac{\lambda}{n_z(1+n_z)}((n_y^2 + n_z(1+n_z))p_y + n_x n_y p_x)$$

where $\lambda$ comprises a scale factor given by:

$$\lambda = \frac{n_z}{n_z - n_x p_x - n_y p_y};$$

and
store said lens tilt compensated image in a memory.

5. An image acquisition system according to claim 4 wherein said calibration module is configured to map image information by: selecting a pixel location $p_x$, $p_y$ in said lens tilt compensated image, determining a corresponding coordinate in said acquired image, determining a plurality of pixel locations in said acquired image surrounding said coordinate, and interpolating pixel values for said surrounding pixel locations to determine a value for the pixel location in said lens tilt compensated image.

6. An image acquisition system according to claim 4 wherein said calibration module is configured to acquire said set of calibrated parameters $$\vec{n} \equiv \begin{pmatrix} n_x \\ n_y \\ n_z \end{pmatrix}$$

by:

acquiring a pair of calibrated scalar parameters NX, NY;

determining a length $d=\mathrm{sqrt}(NX^2+NY^2+1)$; and calculating the components of $\vec{n}$ as follows:

$n_x = NX/d$ $n_y = NY/d$ $n_z = 1/d$.

\* \* \* \* \*